United States Patent
Jarnik et al.

(10) Patent No.: US 10,264,023 B2
(45) Date of Patent: Apr. 16, 2019

(54) METHODS AND APPARATUSES FOR MANAGING SUBSCRIPTIONS ON A SECURITY ELEMENT

(71) Applicant: GIESECKE & DEVRIENT GMBH, München (DE)

(72) Inventors: Claus Jarnik, Windach (DE); Monika Eckardt, Mammendorf (DE)

(73) Assignee: GIESECKE+DEVRIENT MOBILE SECURITY GMBH, Munich (DE)

(*) Notice: Subject to any disclaimer, the term of this patent is extended or adjusted under 35 U.S.C. 154(b) by 94 days.

(21) Appl. No.: 15/104,761

(22) PCT Filed: Dec. 17, 2014

(86) PCT No.: PCT/EP2014/003405
§ 371 (c)(1),
(2) Date: Jun. 15, 2016

(87) PCT Pub. No.: WO2015/090586
PCT Pub. Date: Jun. 25, 2015

(65) Prior Publication Data
US 2016/0315966 A1    Oct. 27, 2016

(30) Foreign Application Priority Data
Dec. 19, 2013  (DE) ................ 10 2013 022 029

(51) Int. Cl.
*H04L 29/06* (2006.01)
*H04W 12/08* (2009.01)
(Continued)

(52) U.S. Cl.
CPC .............. *H04L 63/20* (2013.01); *H04L 63/06* (2013.01); *H04L 63/08* (2013.01);
(Continued)

(58) Field of Classification Search
CPC ......... H04L 63/20; H04L 63/10; H04L 63/08; H04L 63/06; H04L 63/0853; H04W 8/205;
(Continued)

(56) References Cited

U.S. PATENT DOCUMENTS 8,295,807 B2   10/2012   Neumann et al.
9,414,397 B2 *  8/2016   Chong ................ H04W 48/16
(Continued)

FOREIGN PATENT DOCUMENTS

| DE | 102008025792 A1 | 12/2009 |
| EP | 2448215 A1 | 5/2012 |
| GB | 2378094 A | 1/2003 |

OTHER PUBLICATIONS

German Search Report for corresponding German Application No. 102013022029.7, dated Mar. 27, 2014.
(Continued)

*Primary Examiner* — Morshed Mehedi
(74) *Attorney, Agent, or Firm* — Workman Nydegger

(57) ABSTRACT

A method is provided for managing a plurality of subscriptions on a security element of a mobile end device for logging into a respective mobile radio network, and such a security element. The security element has a plurality of memory locations for storing the plurality of subscriptions, wherein the plurality of subscriptions comprises a primary subscription and at least one secondary subscription. In the primary subscription there is deposited a set of rules which determines whether the at least one secondary subscription on the security element can be used.

20 Claims, 2 Drawing Sheets

Figure 1:
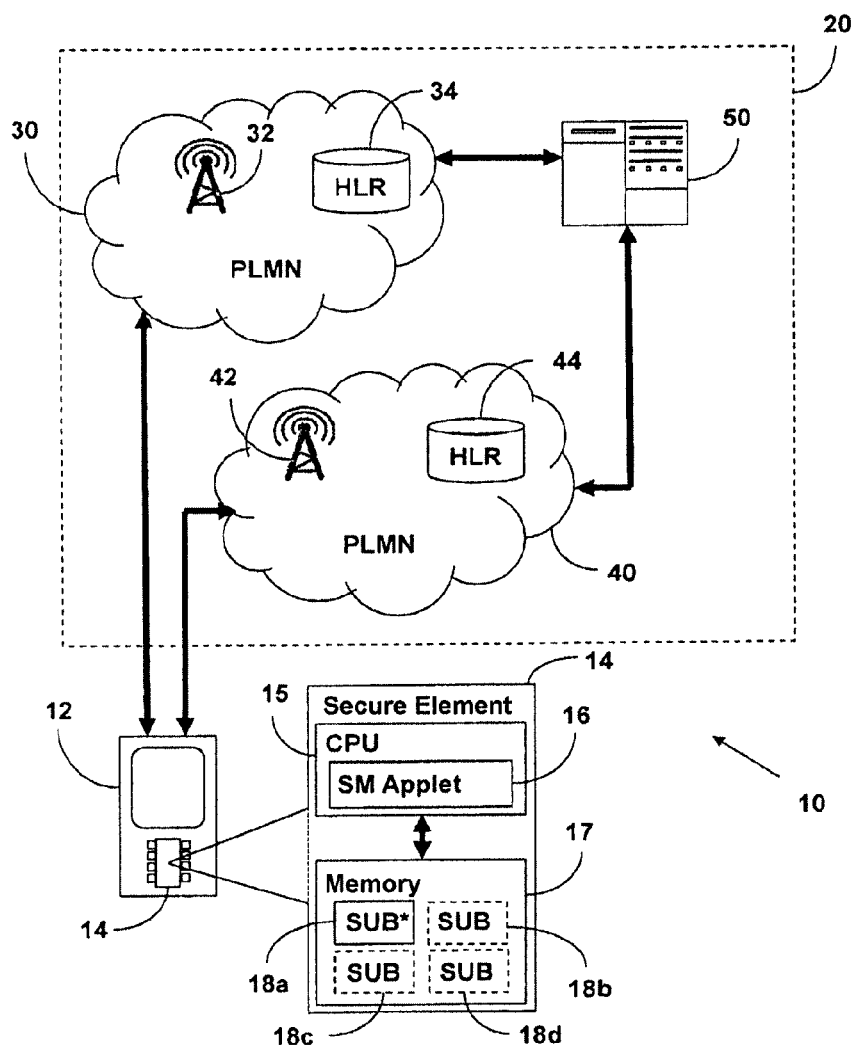

(51) Int. Cl.
*H04W 12/12* (2009.01)
*H04W 8/20* (2009.01)
H04W 88/06 (2009.01)
H04W 8/18 (2009.01)

(52) U.S. Cl.
CPC .......... *H04L 63/0853* (2013.01); *H04L 63/10* (2013.01); *H04W 8/205* (2013.01); *H04W 12/08* (2013.01); *H04W 12/12* (2013.01); *H04W 8/183* (2013.01); *H04W 88/06* (2013.01)

(58) Field of Classification Search
CPC ..... H04W 12/12; H04W 12/08; H04W 8/183; H04W 88/06
See application file for complete search history.

(56) References Cited

U.S. PATENT DOCUMENTS

| | | |
|---|---|---|
| 2005/0164737 A1 | 7/2005 | Brown |
| 2011/0059773 A1 | 3/2011 | Neumann et al. |
| 2015/0143472 A1* | 5/2015 | Kim ...................... H04W 48/02 726/4 |
| 2015/0215844 A1* | 7/2015 | Davis ...................... H04W 8/12 455/432.1 |

OTHER PUBLICATIONS

International Search Report for corresponding International PCT Application No. PCT/EP2014/003405, dated Mar. 18, 2015.

* cited by examiner

METHODS AND APPARATUSES FOR MANAGING SUBSCRIPTIONS ON A SECURITY ELEMENT

FIELD OF THE INVENTION

This invention concerns communication over mobile radio networks in general and, in particular, methods and apparatuses for managing subscriptions on a security element, such as a SIM, an eUICC/UICC, or the like, for logging in to a mobile radio network.

BACKGROUND OF THE INVENTION

Communicating by means of a mobile end device, for example a mobile telephone, over a mobile radio network (also designated as a PLMN [Public Land Mobile Network]) which is operated by a network operator (also designated as an MNO [Mobile Network Operator]) as a rule requires that the mobile end device is equipped with a security element for securely storing data that uniquely identify the user of the mobile end device vis-à-vis the mobile radio network. For example, in a mobile end device that is configured for communicating according to the GSM standard (Global System for Mobile Communications), which is currently one of the most widespread mobile radio standards, there is used a security element with the name SIM (Subscriber Identity Module) usually in the form of a chip card or smart card. According to the GSM standard, whose technical features are defined in a plurality of mutually linked and interdependent specifications, the SIM card contains subscription authorization data ("Subscription Credentials") for identifying and authenticating the user or subscriber, including an IMSI (International Mobile Subscriber Identity) and an authentication key $K_i$. Before a subscriber is given his SIM card, said subscription authorization data are usually securely deposited on the SIM card as part of a subscription (also called the subscription profile) by the SIM-card manufacturer or network operator during a personalization process. A non-personalized SIM card is generally unsuitable for proper employment in a mobile end device, i.e. it is not possible to access a mobile radio network with a non-personalized SIM card without a subscription.

A certain area of application of security elements, such as SIM cards, UICCs, eUICCS, and the like, that in all probability will grow substantially in the near future is M2M communication ("machine-to-machine communication"), i.e. communication between machines over a mobile radio network without human interaction. In M2M communication, data can be automatically exchanged among numerous different kinds of machines which are equipped with a security element in the form of an M2M module, for example TV systems, set-top boxes, vending machines, vehicles, traffic lights, surveillance cameras, sensor apparatuses, and the like. It is foreseeable that at least with some of such apparatuses it will be impossible or at least very difficult to already furnish the security element with a subscription upon manufacture. This is due in particular to the fact that in many M2M apparatuses the security element is implemented in the form of a surface-mounted chip or chip module and at this time it is for example unclear in which country of the world a certain M2M apparatus will be used. Consequently, such M2M apparatuses with non-personalized security elements require the possibility of being furnished with a subscription via the over-the-air interface only upon use in the field.

For utilizing the services supplied by a mobile network operator, in particular communicating over the corresponding mobile radio network, the user of a mobile end device must as a rule pay a monthly fee. If the user wishes to change to another mobile network operator for example for lower monthly fees and/or better services, usually he must manually replace the SIM card supplied by the previous mobile network operator having the subscription for utilizing the mobile radio network of the previous mobile network operator by a SIM card supplied by the new mobile network operator having a subscription for utilizing the mobile radio network of the new mobile network operator. Instead of this conventional procedure, it would unquestionably be simpler and more convenient for the user to have a security element that can be "reprogrammed" by means of a new subscription via the over-the-air interface.

Such methods for downloading a subscription via the over-the-air interface from a server entity to a security element are known in principle from the prior art. Such conventional methods involve the problem, however, that a network operator downloading a subscription to a security element has as a rule no possibility of recognizing, much less determining, alongside which further subscriptions on the security element his subscription is used or can be used, which would be desirable in certain cases.

Against this background, the present invention is faced with the object of providing improved methods and apparatuses for managing a plurality of subscriptions on a security element for logging into a respective mobile radio network that are able to at least partly remedy the hereinabove described disadvantages.

SUMMARY OF THE INVENTION

The hereinabove object is achieved according to the present invention by the respective subject matter of the independent claims. Preferred embodiments of the invention are defined in the dependent claims.

According to a first aspect of the invention, there is provided a method for managing a plurality of subscriptions with subscription authorization data on a security element of a mobile end device for logging into a respective mobile radio network. The security element has a plurality of memory locations for storing the plurality of subscriptions, wherein the plurality of subscriptions comprises a primary subscription and at least one secondary subscription. In the primary subscription there is deposited a set of rules which determines whether the at least one secondary subscription on the security element can be used.

A primary subscription as intended by the invention, like a conventional subscription, allows communication over a mobile radio network and thus comprises as part of the subscription authorization data for example an IMSI and/or an authentication key $K_i$. However, according to the invention a primary subscription further comprises a set of rules which can influence which further subscriptions on the security element can be employed, which will herein be designated as secondary subscriptions. A secondary subscription as intended by the invention therefore corresponds substantially to a conventional subscription, with subscription authorization data which make it possible to communicate over a mobile radio network with the security element of the mobile end device.

Preferably, the primary subscription further comprises, alongside the subscription authorization data and the set of rules, at least one application and/or at least one data set, wherein the set of rules deposited in the primary subscription further determines whether the at least one secondary subscription may access the at least one application or the at least one data set of the primary subscription.

According to an alternative of the first aspect, the invention provides a method for managing a plurality of subscriptions with subscription authorization data on a security element of a mobile end device for logging into a respective mobile radio network. The security element has a plurality of memory locations for storing the plurality of subscriptions, wherein the plurality of subscriptions comprises a primary subscription and at least one secondary subscription. The primary subscription comprises, alongside the subscription authorization data, at least one application and/or at least one data set as well as a set of rules which determines whether the at least one secondary subscription may access the at least one application or the at least one data set of the primary subscription.

Preferably, alongside the primary subscription no further primary subscription on the security element can be used, wherein the set of rules deposited in the primary subscription determines that only secondary subscriptions from certain network operators on the security element can be used.

According to preferred embodiments of the invention, the plurality of subscriptions comprise at least two secondary subscriptions, and the set of rules deposited in the primary subscription determines whether the combination of the at least two secondary subscriptions on the security element can be used.

Preferably, alongside the primary subscription at least one further primary subscription on the security element can be used, and the plurality of subscriptions comprise at least two secondary subscriptions, wherein the set of rules deposited in the primary subscription only holds for a portion of the at least two secondary subscriptions, and in the further primary subscription there is deposited a set of rules which determines whether a secondary subscription of the other portion of the at least two secondary subscriptions on the security element can be used.

According to a second aspect of the invention, there is provided a security element for a mobile end device with a plurality of memory locations for storing a plurality of subscriptions with subscription authorization data for logging into a respective mobile radio network. The plurality of subscriptions comprises a primary subscription and at least one secondary subscription, there being deposited in the primary subscription a set of rules which determines whether the at least one secondary subscription on the security element can be used.

Preferably, the primary subscription further comprises, alongside the subscription authorization data and the set of rules, at least one application and/or at least one data set, wherein the set of rules deposited in the primary subscription further determines whether the at least one secondary subscription may access the at least one application or the at least one data set of the primary subscription.

According to an alternative of the second aspect, the invention provides a security element for a mobile end device with a plurality of memory locations for storing a plurality of subscriptions with subscription authorization data for logging into a respective mobile radio network. The plurality of subscriptions comprises a primary subscription and at least one secondary subscription. The primary subscription comprises, alongside the subscription authorization data, at least one application and/or at least one data set as well as a set of rules which determines whether the at least one secondary subscription may access the at least one application or the at least one data set of the primary subscription.

Preferably, the security element is configured such that alongside the primary subscription no further primary subscription on the security element can be used, and that the set of rules deposited in the primary subscription determines that only secondary subscriptions from certain network operators on the security element can be used.

According to preferred embodiments of the invention, the security element is configured such that the plurality of subscriptions comprise at least two secondary subscriptions, and the set of rules deposited in the primary subscription determines whether the combination of the at least two secondary subscriptions on the security element can be used.

Preferably, the security element is configured such that alongside the primary subscription at least one further primary subscription on the security element can be used, and the plurality of subscriptions comprise at least two secondary subscriptions, wherein the set of rules deposited in the primary subscription only holds for a portion of the at least two secondary subscriptions, and in the further primary subscription there is deposited a set of rules which determines whether a secondary subscription of the other portion of the at least two secondary subscriptions on the security element can be used.

A security element according to the invention is for example a data carrier configured in hardware. The security element is for example arranged as a firmly integrated component in an end device, whereby it either in this form cannot be removed from the end device, for example as a subscriber identification module, M2M module, coprocessor, Trusted Base, Trusted Platform Module. Alternatively, the security element is connected to the mobile end device as a removable module, for example as a chip card, in particular as a subscriber identification module, smart card, mass memory card, USB token, MultiMediaCard, secure MicroSD card, mobile radio network token, e.g. a UMTS Internet stick, and/or as an electronic identity document, for example as an electronic identity card or passport, with a person's machine-readable identification data deposited in a memory area.

According to a further alternative, the security element can be configured as a combination of hardware and software components in a trustworthy part of an operating system of the end device, which is also known to the skilled person as a secure runtime environment ("Trusted Execution Environment"; TEE). The security element can then be configured for example within such a secure runtime environment in the form of programs running therein, so-called trustlets.

The security element may in principle be a computer with reduced overall size and a reduced range of resources, which has a processor and at least one interface for communication with an external device. It frequently possesses no, or only a rudimentary, user data output of its own. The security element has in particular a data memory for depositing data, information, files and/or applications with appurtenant variables, wherein areas of the data memory can be volatile or non-volatile. The non-volatile data memory can be in particular permanent, for example as a Read-Only Memory (ROM), or semi-permanent, for example as an Electrically Erasable Programmable Read-Only Memory (EEPROM), flash memory, Ferroelectric Random Access Memory (FRAM or FeRAM memory), or Magnetoresistive Random Access Memory (MRAM memory).

As the skilled person will recognize, the hereinabove described preferred embodiments can be implemented advantageously both within the context of the first aspect of the invention, i.e. within the context of the method for managing a plurality of subscriptions on a security element, and within the context of the second aspect of the invention, i.e. within the context of such a security element.

Figure 2:
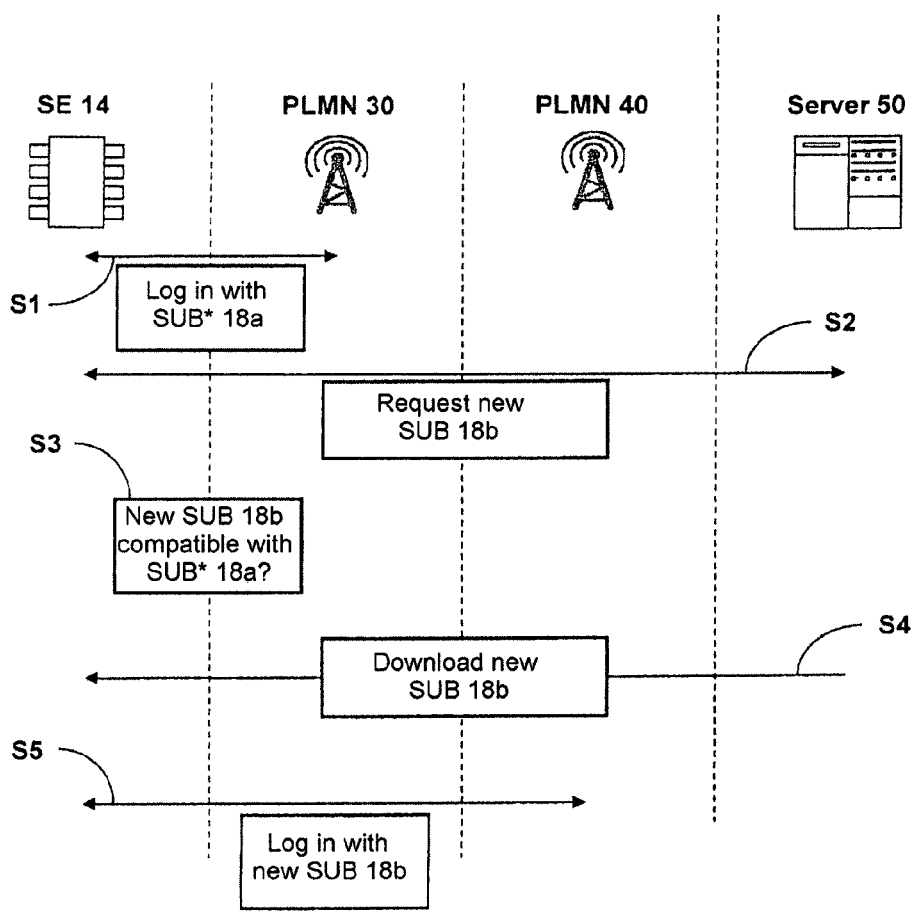

Further features, advantages and objects of the invention will emerge from the following detailed description of several embodiment examples and embodiment alternatives. Reference is made to the drawings, in which there are shown:

FIG. 1 a schematic representation of a communication system having a security element in the form of an eUICC, which illustrates different aspects of the present invention, and FIG. 2 a schematic representation of a preferred sequence for managing subscriptions on the security element of FIG. 1.

FIG. 1 shows a schematic representation of the components of a communication system 10 and some of the communication connections between said components, which illustrates different aspects of the present invention. Although reference will be made to a "mobile" end device in the following detailed description, the skilled person will recognize that the present invention can be implemented advantageously in connection with every kind of end device that is configured for communicating over a mobile or cellular communication network, i.e. also with end devices whose location practically does not change. In other words, the herein employed attribute "mobile" relates to the ability of the end device to communicate over a mobile or cellular communication network, including IP-based communication networks.

An exemplary mobile end device 12 is represented in FIG. 1, comprising a security element ("Secure Element") 14 for securely storing and processing data that for example uniquely identify the mobile end device 12 and/or its user. As indicated in FIG. 1, the mobile end device 12 is preferably a mobile telephone, a smartphone or a similar apparatus. The skilled person will recognize, however, that the mobile end device 12 according to the present invention can likewise be implemented in the form of other apparatuses that are adapted for communicating over a mobile radio network, such as a tablet computer, a notebook, a TV system, a set-top box, a vending machine, an automobile, a surveillance camera, a sensor apparatus, and the like.

According to preferred embodiments of the invention, the security element 14 is configured as an eUICC (embedded Universal Integrated Circuit Card) with a SIM application implemented thereon, i.e. as a security element that is a permanent component of the mobile end device 12 and is employed in a mobile radio network for uniquely and securely identifying the user or subscriber and for supplying different functions and value-added services. Alternatively, the security element 14 can be configured as a UICC (Universal Integrated Circuit Card) or SIM card (Subscriber Identity Module) which is known to the skilled person as one of the currently most frequently employed forms of security element. The skilled person will recognize, however, that other kinds of security elements, which are designated as USIM, R-UIM, ISIM, and the like, depending on the generation and type of underlying mobile radio standard, are likewise embraced by the present invention.

According to further preferred embodiments of the invention, the security element 14 can be configured as a combination of hardware and software components in a trustworthy part of an operating system of a central processing unit of the mobile end device 12, which is also known to the skilled person as a secure runtime environment ("Trusted Execution Environment"; TEE). The security element 14 can then be configured for example within such a secure runtime environment of the mobile end device 12 in the form of programs running therein, so-called Trustlets®.

The mobile end device 12 is configured for communicating via the over-the-air interface with a mobile radio network (also designated as a "Public Land Mobile Network" [PLMN]) of a mobile radio system 20. In FIG. 1 the mobile radio networks 30 and 40 are represented by way of example. It is conceivable that the mobile radio network 30 is operated by a first mobile network operator (also designated as a "Mobile Network Operator" or MNO), and the second mobile radio network 40 by a second mobile network operator. According to preferred embodiments of the invention, the mobile radio network 30 and/or the mobile radio network 40 are operated according to the GSM standard ("Global Standard for Mobile Communications").

Hereinafter some preferred embodiments of the invention will be described in connection with mobile radio networks 30, 40 as part of the mobile radio system 20 according to the GSM standard, which is specified in a plurality of ETSI specifications. The skilled person will recognize, however, that the present invention can also be used advantageously in connection with other mobile radio networks. Such networks comprise mobile radio networks of the third generation (3GPP), such as UMTS (Universal Mobile Telecommunications System), mobile radio networks of the fourth generation (4G), such as LTE (Long Term Evolution), and other mobile radio networks, such as CDMA, and the like.

As is known to the skilled person, a mobile radio network or PLMN constructed according to the GSM standard generally comprises a BSS ("Base Station Subsystem") which consists of a plurality of BTSs ("Base Transceiver Stations") which define respective radio cells of the PLMN and are connected to a BSC ("Base Station Controller"). Usually, the BSC is one of a plurality of BSCs which communicate with a common MSC ("Mobile Switching Center"). Frequently, a local database, which is called the VLR ("Visitor Location Register"), is part of the MSC in order to hold information available about the mobile radio subscribers who are located at the moment in the radio cells that are served by an MSC (i.e. the range covered by an MSC). The MSC supplies substantially the same functionality as a switching center in a fixed-line network (public-switched telephone network; PSTN) and is in communication with an HLR ("Home Location Register"), which is the PLMN's primary database storing information for logging in or authentication of the mobile radio subscribers. For this purpose, the HLR usually has access to an AUC ("Authentication Center"). As is known to the skilled person, the communication connections between the hereinabove described components of a PLMN can be based on proprietary and/or open standards. The employed protocols can be for example SS7- or IP-based. How the network components are configured as separate or combined units and how the interfaces between said components are configured is up to the MNO, so that the hereinabove description is merely to be understood as exemplary.

The skilled person will recognize that, although the hereinabove described functional units of a conventional mobile radio network according to the GSM standard can have other names in other or future mobile radio standards, the basic principles are substantially the same and they are hence likewise embraced by the invention.

For clarity's sake, the schematic representation of FIG. 1 shows, of the hereinabove described components of a mobile radio network, merely the following: an exemplary BTS 32 and an HLR 34 for the mobile radio network 30 and an exemplary BTS 42 and an HLR 44 for the mobile radio network 40. As indicated by FIG. 1, the mobile radio network 30 and the mobile radio network 40 are in communication at least at times with a background system 50, preferably in the form of a suitably configured server, as to be described hereinafter in detail. The mobile radio network 30 and/or the mobile radio network 40 can respectively have, alongside further functional units known to the skilled person, for example an SMS-C ("Short Message Service Center") for storing, relaying, converting and delivering SMS messages, by means of which for example data from the background system 50 can be transferred to the security element 14 of the mobile end device 12.

As indicated by the enlarged view of the security element 14 in FIG. 1, the security element 14 preferably comprises a central processing unit or a central processor (CPU) 15. Preferably, the processor 15 is equipped such that applications can be executed on the processor 15, such as a subscription management application ("SM applet") which preferably supplies at least some of the features for managing subscriptions on the security element 14, as to be described in detail hereinafter in connection with FIG. 2. Preferably, the subscription management application 16 is implemented in the form of a Java applet. For supplying a corresponding runtime environment for the SM applet 16, a secure operating system (not shown in FIG. 1) can preferably be implemented on the processor 15.

The security element 14 preferably further comprises a memory unit 17 which is preferably implemented as a non-volatile, rewritable memory unit, e.g. in the form of a flash memory. As indicated by FIG. 1, a first subscription 18a (SUB*) is stored in the memory unit 17 of the security element 14. Preferably, the first subscription 18a contains data that enable the security element 14 and the mobile end device 12 to log into the mobile radio network 30 and communicate thereover, i.e. in particular subscription authorization data ("Subscription Credentials") and, in some cases, an MNO-specific authentication algorithm, and the like. Preferably, at least parts of the memory unit 17 of the security element 14 are configured for securely storing the data therein, for example the confidential subscription authorization data, such as an IMSI ("International Mobile Subscriber Identity") or an authentication key $K_i$, which are part of the subscription 18a.

As indicated in FIG. 1, the memory unit 17 preferably has at least three further slots for accommodating additional subscriptions, for example for accommodating the further subscription 18b-d represented in FIG. 1.

In the preferred embodiment represented in FIG. 1, it is provided according to the invention that the subscription 18a present on the security element 14 is a primary subscription, which is to be indicated by the asterisk. A primary subscription as intended by the invention, like a conventional subscription, allows communication over a mobile radio network and thus comprises subscription authorization data, for example an IMSI and/or an authentication key $K_i$. However, according to the invention a primary subscription further comprises a set of rules which can influence which further subscriptions on the security element 14 can be employed, which are designated herein as secondary subscriptions. A secondary subscription as intended by the invention therefore corresponds substantially to a conventional subscription, i.e. comprises in particular subscription authorization data which make it possible to communicate over a mobile radio network with the security element 14 of the mobile end device 12.

According to preferred or alternative embodiments of the invention, the primary subscription can comprise, alongside the subscription authorization data, an application and/or at least one data set, wherein the set of rules deposited in the primary subscription additionally or alternatively determines whether a secondary subscription may access the application or the at least one data set of the primary subscription. A particular advantage of these preferred or alternative embodiments of the invention is that a mobile network operator must provide e.g. a standard application, e.g. an MNO-specific authentication algorithm, and/or a standard data set, only in its primary subscription in order to define by the set of rules deposited therein which secondary subscriptions of the mobile network operator are to have access to said standard application and/or said standard data set.

The manner of functioning of the background system 50 in connection with the other elements of the communication system 10 represented in FIG. 1 will now be described in connection with a preferred embodiment of the invention with further reference to FIG. 2.

In the step S1 of FIG. 2, the security element 14 logs into the PLMN 30 with the primary subscription 18a. This step as a rule involves an authentication of the security element 14 vis-à-vis the PLMN 30, for example employing an IMSI and/or an authentication key $K_i$ which are part of the primary subscription 18a. It is conceivable that the primary subscription 18a has already been deposited in the memory unit 17 of the security element 14 during manufacture and/or personalization of the mobile end device 12 and/or security element 14. According to a variant according to the invention, it is likewise conceivable that the primary subscription 18a is supplied on the security element 14 OTA when the mobile end device 12 and the security element 14 are already being employed in the field. In this variant, it is conceivable that during manufacture or personalization only a provisional subscription is deposited on the security element 14, which enables the user of the mobile end device 12 to install a complete subscription, for example the primary subscription 18a, on the security element 14.

As soon as the security element 14 has logged into the PLMN 30 with the primary subscription 18a in step S1, it can communicate with the background system 50 over the PLMN 30. During this communication the security element 14 can, in step S2 of FIG. 2, request a new subscription in the form of a secondary subscription 18b in order to be able to also communicate over the PLMN 40 with said secondary subscription 18b.

According to the invention, it is now checked preferably by the security element 14, in step S3 of FIG. 2, whether the secondary subscription 18 is compatible with the primary subscription 18a already present on the security element 14, i.e. whether the set of rules deposited according to the invention in the primary subscription allows the secondary subscription 18b to be used alongside the primary subscription 18a on the security element 14. This check could be carried out for example through the SM applet 16 on the security element 14.

If this is the case, the security element 14, in step S4 of FIG. 2, downloads the secondary subscription 18b from the background system 50 and stores it in one of the accordingly provided slots of the memory unit 17 of the security element 14.

In step S5 of FIG. 2, the security element 14 can now log into the PLMN 40 with the secondary subscription 18b downloaded from the background system 50, in order to communicate over said network.

According to preferred embodiments of the invention, alongside the primary subscription 18a no further primary subscription on the security element can be used.

Preferably, the set of rules deposited in the primary subscription 18a can determine that only secondary subscriptions from certain network operators on the security element can be used. For example, it may be in the interests of the operator of the PLMN 30 that the security element 14 it has equipped with the primary subscription 18a can also be employed for communicating over the PLMN 40 by means of the secondary subscription 18b.

According to preferred embodiments of the invention, it is likewise conceivable that the set of rules deposited in the primary subscription 18a can determine whether certain combinations of two or secondary subscriptions on the security element 14 can be used. For example, the set of rules deposited in the primary subscription 18a can determine that on the security element 14 there cannot be present the secondary subscription 18b together with the secondary subscription 18c.

According to a further variant according to the invention, it is conceivable that alongside the primary subscription 18a one or a plurality of further primary subscriptions on the security element are present. In this variant, the set of rules deposited in the first primary subscription 18a only holds for a portion of the secondary subscriptions, for example the secondary subscription 18b, and the sets of rules respectively deposited in the further primary subscriptions likewise only for a portion of the secondary subscriptions, for example the secondary subscription 18d.

The invention claimed is:

1. A method for managing a plurality of subscriptions on a security element of a mobile end device, the method comprising:
   providing a security element having a hardware storage device that includes a plurality of memory locations configured to store a plurality of subscriptions, and
   storing the plurality of subscriptions in the hardware storage device of the security element, the plurality of subscriptions including a primary subscription and at least a secondary subscription,
      each of the plurality of subscriptions respectively including subscription authorization data that provides for communication by the security element of the mobile end device over a respective mobile radio network such that
         the primary subscription includes first subscription authorization data that provides for communication by the security element of the mobile end device over a first radio network and
         the secondary subscription includes second subscription authorization data that provides for communication by the security element of the mobile end device over a second radio network,
   wherein in the primary subscription there is deposited a set of rules which determines whether the secondary subscription on the security element is usable on the security element.

2. The method according to claim 1, wherein the primary subscription comprises, alongside the subscription authorization data and the set of rules, at least one application and/or at least one data set, wherein the set of rules deposited in the primary subscription further determines whether the at least one application or the at least one data set of the primary subscription is accessible by the secondary subscription.

3. A method for managing a plurality of subscriptions on a security element of a mobile end device, the method comprising:
   providing a security element having a hardware storage device that includes a plurality of memory locations configured to store a plurality of subscriptions, and
   storing the plurality of subscriptions in the hardware storage device of the security element, the plurality of subscriptions including a primary subscription and at least a secondary subscription,
      each of the plurality of subscriptions respectively including subscription authorization data that provides for communication by the security element of the mobile end device over a respective mobile radio network such that
         the primary subscription includes first subscription authorization data that provides for communication by the security element of the mobile end device over a first radio network and
         the secondary subscription includes second subscription authorization data that provides for communication by the security element of the mobile end device over a second radio network,
   wherein the primary subscription has, alongside the subscription authorization data, at least one application and/or at least one data set as well as a set of rules which determines whether the at least one application or the at least one data set of the primary subscription is accessible by the secondary subscription.

4. The method according to claim 1, wherein alongside the primary subscription no further primary subscription on the security element is usable on the security element, and
   wherein the set of rules deposited in the primary subscription determines that only secondary subscriptions from certain network operators on the security element are usable on the security element.

5. The method according to claim 1, wherein the plurality of subscriptions comprise at least two secondary subscriptions, and the set of rules deposited in the primary subscription determines whether the combination of the at least two secondary subscriptions on the security element are usable on the security element.

6. The method according to claim 1, wherein alongside the primary subscription at least one further primary subscription on the security element is usable on the security element, and the plurality of subscriptions comprise at least two secondary subscriptions,
   wherein the set of rules deposited in the primary subscription only holds for a portion of the at least two secondary subscriptions, and in the further primary subscription there is deposited a set of rules which determines whether a secondary subscription of the other portion of the at least two secondary subscriptions on the security element is usable on the security element.

7. A security element for a mobile end device, the security element comprising:
   a hardware storage device having a plurality of memory locations configured to store a plurality of subscriptions,
   wherein the storage device has stored thereon the plurality of subscriptions, the plurality of subscriptions including a primary subscription and at least a secondary subscription, each of the plurality of subscriptions respectively including subscription authorization data that provides for communication by the security element of the mobile end device over a respective mobile radio network such that the primary subscription includes first subscription authorization data that provides for communication by the security element of the mobile end device over a first radio network, and the secondary subscription includes second subscription authorization data that provides for communication by the security element of the mobile end device over a second radio network, and wherein in the primary subscription there is deposited a set of rules which determines whether the secondary subscription on the security element is usable on the security element.

8. The security element according to claim 7, wherein the primary subscription comprises, alongside the subscription authorization data and the set of rules, at least one application and/or at least one data set, wherein the set of rules deposited in the primary subscription further determines whether the at least one application or the at least one data set of the primary subscription is accessible by the secondary subscription.

9. A security element for a mobile end device, the security element comprising:

a hardware storage device having a plurality of memory locations configured to store a plurality of subscriptions, wherein the storage device has stored thereon the plurality of subscriptions, the plurality of subscriptions including a primary subscription and at least a secondary subscription, each of the plurality of subscriptions respectively including subscription authorization data that provides for communication by the security element of the mobile end device over a respective mobile radio network such that the primary subscription includes first subscription authorization data that provides for communication by the security element of the mobile end device over a first radio network and the secondary subscription includes second subscription authorization data that provides for communication by the security element of the mobile end device over a second radio network, and wherein the primary subscription comprises, alongside the subscription authorization data, at least one application and/or at least one data set as well as a set of rules which determines whether the at least one application or the at least one data set of the primary subscription is accessible by the secondary subscription.

10. The security element according to claim 7, wherein the security element is configured such that alongside the primary subscription no further primary subscription on the security element is usable on the security element, and that the set of rules deposited in the primary subscription determines that only secondary subscriptions from certain network operators on the security element are usable on the security element.

11. The security element according to claim 7, wherein the security element is configured such that the plurality of subscriptions comprise at least two secondary subscriptions, and the set of rules deposited in the primary subscription determines whether the combination of the at least two secondary subscriptions on the security element is usable on the security element.

12. The security element according to claim 7, wherein the security element is configured such that alongside the primary subscription at least one further primary subscription on the security element is usable on the security element, and the plurality of subscriptions comprise at least two secondary subscriptions, wherein the set of rules deposited in the primary subscription only holds for a portion of the at least two secondary subscriptions, and in the further primary subscription there is deposited a set of rules which determines whether a secondary subscription of the other portion of the at least two secondary subscriptions on the security element is usable on the security element.

13. The security element according to claim 7, wherein the security element is a SIM, eUICC/UICC or M2M module.

14. A mobile end device having a security element according to claim 7.

15. The method according to claim 1, wherein the security element is a SIM, an eUICC, a UICC, or a M2M module.

16. The method according to claim 1, wherein the security element includes a processor configured to process data.

17. The method according to claim 16, wherein the processor is configured to execute a subscription management application that manages subscriptions on the security element.

18. The method according to claim 1, wherein the security element includes at least one interface for communication with an external device.

19. The method according to claim 1, wherein the security element is arranged as a firmly integrated component in the mobile end device.

20. The method according to claim 1, wherein the security element is connected to the mobile end device as a removable hardware module.

* * * * *